United States Patent
Yamano et al.

(10) Patent No.: US 6,269,471 B1
(45) Date of Patent: Jul. 31, 2001

(54) INFORMATION CIRCUIT WIRING ALLOWING EFFICIENT LAYOUT

(75) Inventors: Yoshiaki Yamano; Tomonori Inagaki; Tatsuo Inoue, all of Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/013,475

(22) Filed: Jan. 26, 1998

(30) Foreign Application Priority Data

Jan. 30, 1997 (JP) .................................................. 9-017199

(51) Int. Cl.⁷ .................................................. G06F 17/50
(52) U.S. Cl. .................. 716/13; 716/11; 439/55; 439/151
(58) Field of Search ........................ 395/500.14, 500.09, 395/500.12, 500.01; 439/61, 151; 716/13, 8, 11

(56) References Cited

U.S. PATENT DOCUMENTS

| | | | |
|---|---|---|---|
| 3,917,371 | * 11/1975 | Hirokawa et al. | 439/52 |
| 5,149,277 | * 9/1992 | LeMaster | 439/207 |
| 5,168,904 | * 12/1992 | Quinkert | 140/92.1 |
| 5,486,113 | * 1/1996 | Lundh | 439/61 |
| 5,667,387 | * 9/1997 | Klemm | 434/224 |
| 5,905,654 | * 5/1999 | Tanino et al. | 364/468.09 |

FOREIGN PATENT DOCUMENTS 53-38421  10/1978  (JP).
8-331734  12/1996  (JP).

* cited by examiner

*Primary Examiner*—Matthew Smith
*Assistant Examiner*—Vuthe Siek
(74) *Attorney, Agent, or Firm*—Oliff & Berridge, PLC

(57) ABSTRACT

On a floor of a building, a wiring layout of information circuits which are used by personnel who work at a plurality of blocks, has at each block outlet connectors connected to information devices at the block. An interconnection unit has primary connectors connected to extend devices e.g. telephone exchange or network controller, and secondary connectors. Wiring structures each having a plurality of wiring cables connect respective groups of the secondary connectors to respective blocks.

Interconnection cables detachably and interchangeably connect the primary and secondary connectors at the interconnection unit. To enable efficient and simple re-arrangement for the information circuits, first identification signs, e.g. colors, identify blocks associated with the respective wiring cables, and at the interconnection unit, the secondary outlets connected by one of the wiring structures to one of the blocks are grouped together in space and have associated with them an identification sign which is the same as the first identification sign identifying the block to which they are connected.

7 Claims, 7 Drawing Sheets

| OUTLET NO. | 1 | 2 | 3 | 4 | 5 | 6 |
|---|---|---|---|---|---|---|
| V1 | TEL1 | TEL2 | PC1 | TEL3 | PC2 | TEL4 |
| V2 | TEL5 | TEL6 | PC3 | TEL7 | PC4 | TEL8 |
| V3 | TEL9 | TEL10 | PC5 | TEL11 | PC6 | TEL12 |
| V4 | TEL13 | TEL14 | PC7 | TEL15 | PC8 | TEL16 |
| V5 | TEL17 | TEL18 | PC9 | TEL19 | PC10 | TEL20 |
| V6 | PC11 | TEL21 | PC12 | TEL22 | | |

FIG. 5

INFORMATION CIRCUIT WIRING ALLOWING EFFICIENT LAYOUT

BACKGROUND OF THE INVENTION

1. Field of Invention

The invention relates to wiring of information circuits, and particularly to a wiring layout of information circuits provided at one working location, e.g. telephone and computer connection circuits provided in one room or one floor of a building, or in a whole building.

2. Description of Related Art

As a method for wiring the information circuits of information device terminals, such as telephones, personal computers and the like, in an office or other working location, it is known to connect the terminals with collective information handling devices, such as telephone switchboards, LAN units and the like, by aggregating the information circuits of the respective information device terminals.

FIG. 6 shows wiring in such an office. The office is divided into a plurality of blocks, such as department units or section units. One or more people work at each block. Information device terminals, such as telephones, personal computers and the like, are arranged on desks constituting the respective blocks A to F, and the information device terminals are connected via wire harnesses 1 installed at each block A to F to an interconnection unit 3.

The wire harnesses 1 are composed of the bundles of circuit cables, having connectors 2 equipped with modular outlets at one end. The various information device terminals are connected to the wire harnesses 1 through the connectors 2. The use of bundled wire harnesses in buildings is disclosed in JP-A-8-33 1734, published Dec. 8, 1996.

The interconnection unit 3 is equipped with a plug board 4 shown in FIG. 7, which has a primary side and a secondary side. The modular outlets 5 connected to the collective information handling devices such as telephone switchboards, network servers and the like are arranged at the primary side, while the modular outlets 6 installed on the respective circuit cables of the respective wire harnesses 1 are arranged at the secondary side. Connecting cables 7 equipped with modular jacks at both ends are connected between the respective outlets 5 at the primary side and the respective outlets 6 at the secondary side, whereby the respective information device terminals are connected in the desired manner to the fixed collective devices.

With such wiring, when a layout in an office is changed, for example, when the block A is replaced by the block B as a whole, changing of the connection positions of the connecting cables 7 in the plug board 4 enable the wiring of the block A to be exchanged with the wiring of the block B without renewing the laying of the wire harnesses 1.

However, in such a conventional wiring system, as only sequential numbers are usually attached to the respective outlets 5, 6 of the plug board 4, it cannot be identified which blocks of which information device terminals the modular outlets 6 at the secondary side are connected to by inspecting only the plug board 4 at the time of a layout change.

Therefore, a layout table in which sequential numbers attached to the respective modular outlets 6 at the secondary side correspond with the information device terminals is usually prepared, and the work of exchanging the connecting cables 7 is done by inspecting the layout table. When there are large numbers of the modular outlets 6 in use on the secondary side, the modular outlets 6 must be searched relying on the sequential numbers, but it is troublesome to find the modular outlets 6 whose connection is to be altered. Further, when there is no layout table at hand, there is an inconvenience that it cannot be identified which blocks of which information device terminals the modular outlets 6 are connected to.

Since the connecting cables 7 connecting the primary side to the secondary side are usually all the same, independent of the kind of the collective device, in the plug board 4, there is an inconvenience that it is difficult to identify which collective information handling devices the modular outlets 6 at the secondary side are connected to.

SUMMARY OF THE INVENTION

The invention has as its object to provide a wiring layout for information circuits, wherein information circuits from a plurality of information device terminals are aggregated in an interconnection unit and connected to collective information handling devices, such as telephone switchboards, LAN units and the like, in which the above-mentioned problems are at least partially solved and in which the work required for rearranging the connecting cables in an interconnection unit according to layout change and the like can be efficiently carried out.

According to the invention, there is provided a wiring layout of information circuits which are used by personnel who work at a plurality of blocks, each block accommodating at least one person, the wiring layout comprising:

at each block, a plurality of outlet connectors connectible in use to information devices used by personnel at the block, an interconnection unit having a plurality of primary connectors adapted to be connected to collective information handling devices, and a plurality of secondary connectors, a plurality of wiring structures each comprising a plurality of wiring cables connecting respective groups of the secondary connectors to respective ones of the blocks, the wiring cables of each wiring structure terminating at the respective outlet connectors of the block, and a plurality of interconnection cables detachably and interchangeably connecting the primary connectors and the secondary connectors at the interconnection unit, wherein (i) first identification signs which identify respective ones of the blocks are associated with the wiring cables, and (ii) at the interconnection unit, the plurality of the secondary outlets connected by a respective one of the wiring structures to one of the blocks are grouped together in space and have associated with them an identification sign which is the same as the one of the first identification signs identifying the block to which they are connected.

With this arrangement it can be easily identified at which part of the interconnection unit each secondary connector associated with a specific block, from among the many secondary connectors in the interconnection unit, is attached.

Preferably second identification signs which identify respective ones of the wiring cables in each wiring structure are associated with the wiring cables, and identification signs which are the same as the second identification signs are provided in association with the respective secondary connectors to which the wiring cables are respectively connected. In this case, it can be easily identified which secondary connectors the respective circuit cables correspond to.

Preferably also third identification signs enabling identification of the collective information handling devices are provided on the interconnection cables. Then, it can be easily identified which collective devices the respective wiring cables are connected to.

BRIEF DESCRIPTION OF THE DRAWINGS

An embodiment of the invention will now be described by way of example with reference to the accompanying drawings in which:

FIG. 5 is a table showing one example of a layout table used in the invention;

DETAILED DESCRIPTION OF PREFERRED EMBODIMENTS

Figure 1:
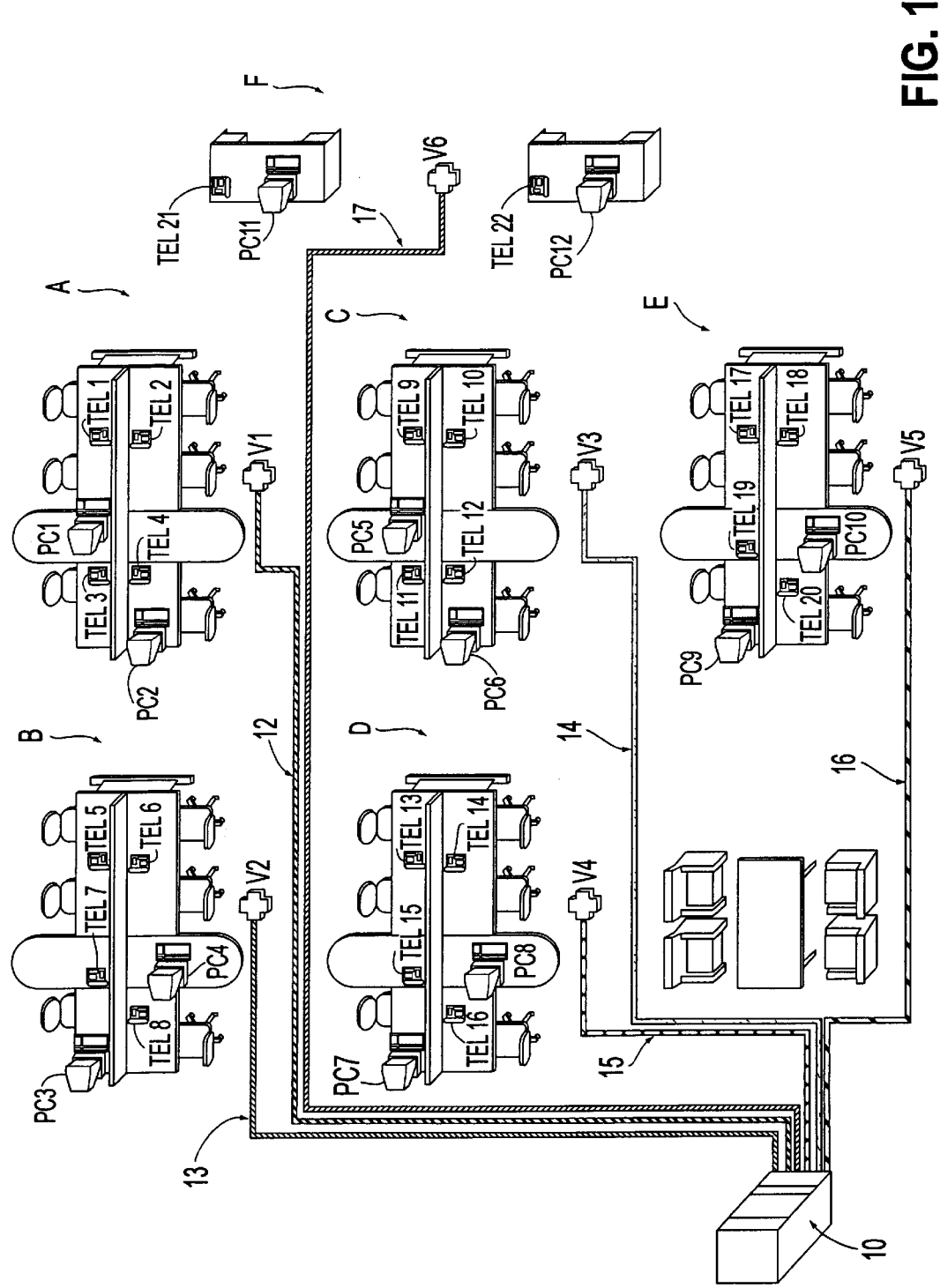
FIG. 1 is a diagram showing a wiring layout in an office embodying the invention.

FIG. 1 shows an example of a wiring layout in an office embodying the invention. The working space of the office comprises a plurality of work stations, herein called blocks A to F, such as department units or section units. Information device terminals, such as telephones, personal computers and the like, are arranged on desks of the respective blocks A to F. Specifically, four telephone sets (TEL 1 to TEL 20 in Figure) and two personal computers (illustrated as PC 1 to PC 10 in Figure) are provided at each of the blocks A to E, and a telephone set (illustrated as TEL 21 and TEL 22 in Figure) and a personal computer (illustrated as PC 11 and PC 12 in Figure) are at each of the two desks of block F.

The interconnection unit 10 for connecting the information device terminals to external collective information handling devices, such as a telephone exchange or switchboard or a PC network controller, is at a fixed position in the office, and the wire harnesses 12 to 17 are laid between the interconnection unit 10 and the respective blocks A to F.

Figure 2:
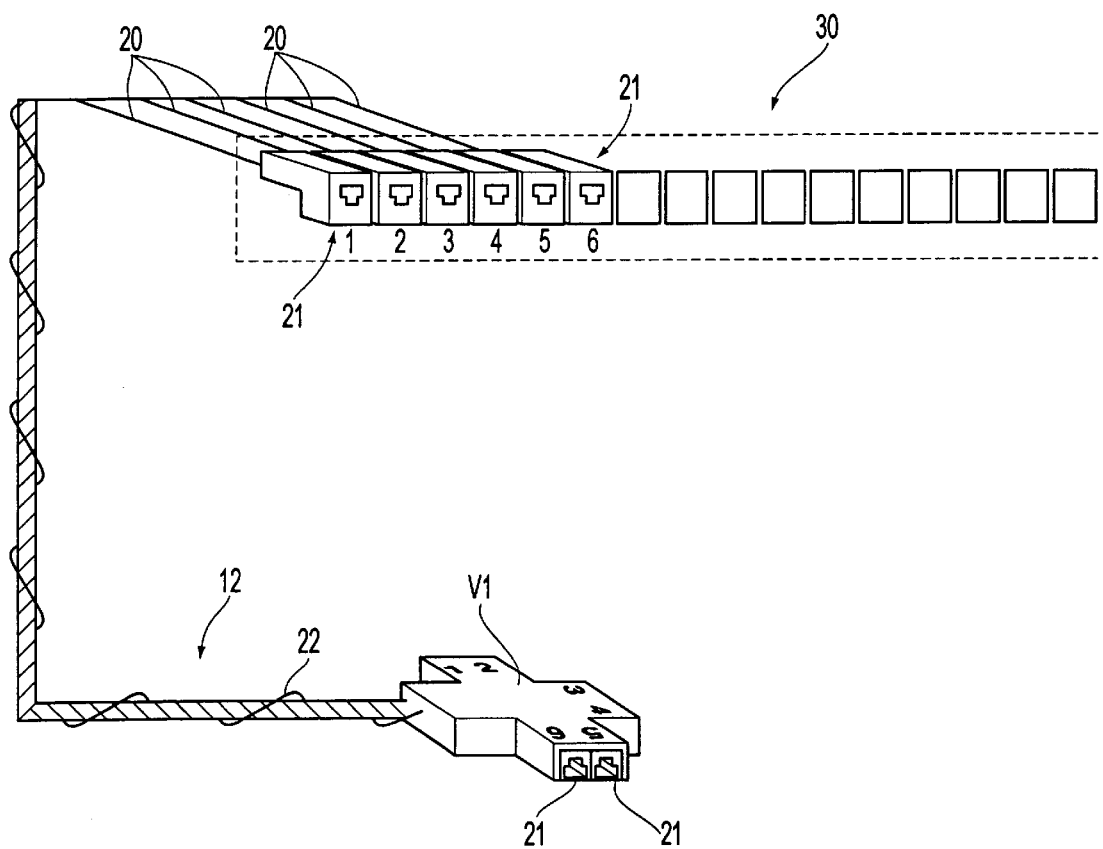
FIG. 2 is a diagrammatic view showing a wire harness used in the wiring layout of FIG. 1.
Figure 3:
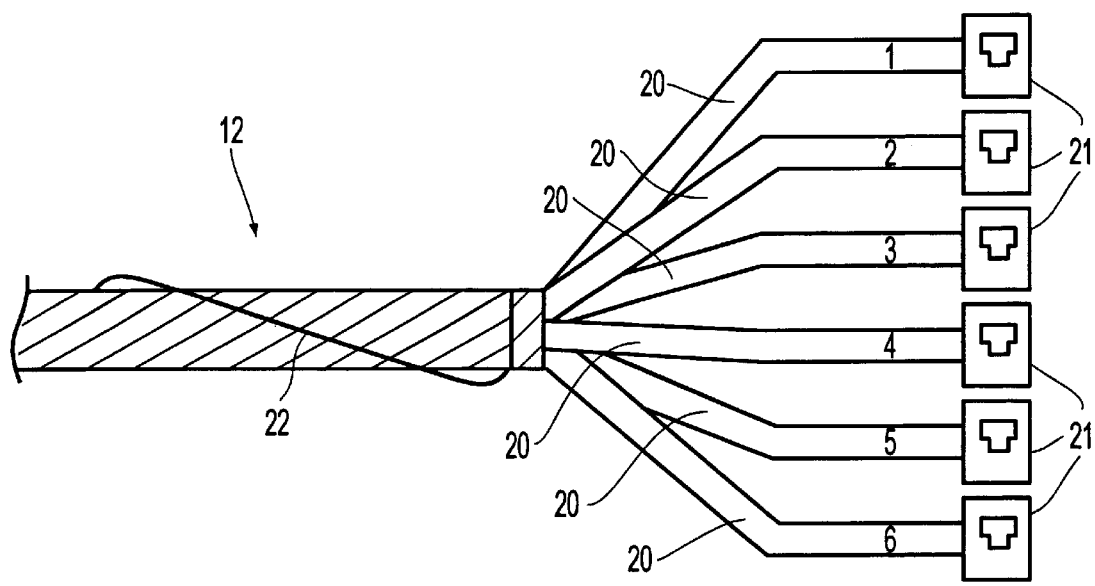
FIG. 3 is a partial view showing one end of the circuit cables which constitute the wire harness of FIG. 2.

In FIGS. 2 and 3, the structure of the wire harness 12 is shown. The wire harness 12 has six twisted pair wires 20 (hereinafter referred to as the circuit cables 20). Modular outlets 21 are installed on both ends of the circuit cables 20. The modular outlets 21 at a first end of the circuit cables 20 are located in the connector housing of the connector V1, and the modular outlets 21 at the second end of the circuit cables 20 are installed in the interconnection unit 10 (see FIG. 4).

As shown in FIG. 3, the identification digits "1" to "6" (the second identification symbols of the invention) which identify the respective circuit cables 20 are attached on the respective circuit cables 20 at fixed intervals over their whole length, and further the identification digits "1" to "6" for identifying the modular outlets 21 are placed on them or next to them as shown in FIG. 2. The modular outlets 21 at the first end of the circuit cables 20 are mounted in the connector housing of the connector V1 so that the identification digits of the respective circuit cables 20 coincide with the identification digits of the connector V1.

The circuit cables 20 are mutually twisted and integrated, for example, by twisting a red tape 22 (the first identification symbol of the invention), and further the modular outlets 21 which are in the connector V1 are colored in the same color as this tape on the circuit cables 20.

The wire harnesses 13 to 17 laid to the other blocks B to F have the same structure as the wire harness 12, but the color of the tape binding their circuit cables 20 and the color of the modular outlets 21 are selected in each case so that they may mutually differ among the respective blocks A to F. The colors of the tapes 22 are, for example, yellow, green, blue, purple and brown in the wire harnesses 13 to 17.

Figure 4:
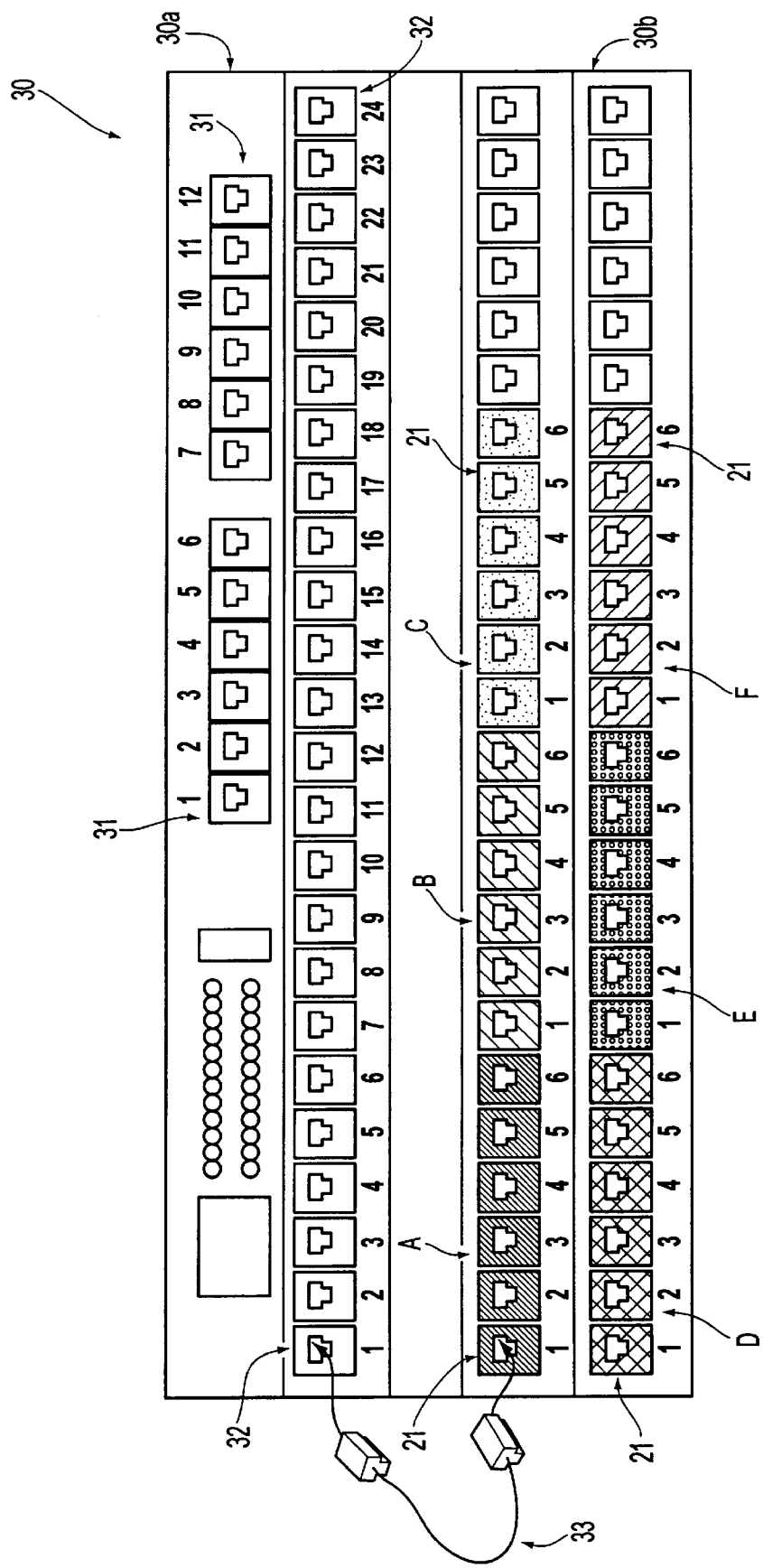
FIG. 4 is a view showing the plug board of an interconnection unit in the wiring layout of FIG. 1.
Figure 6:
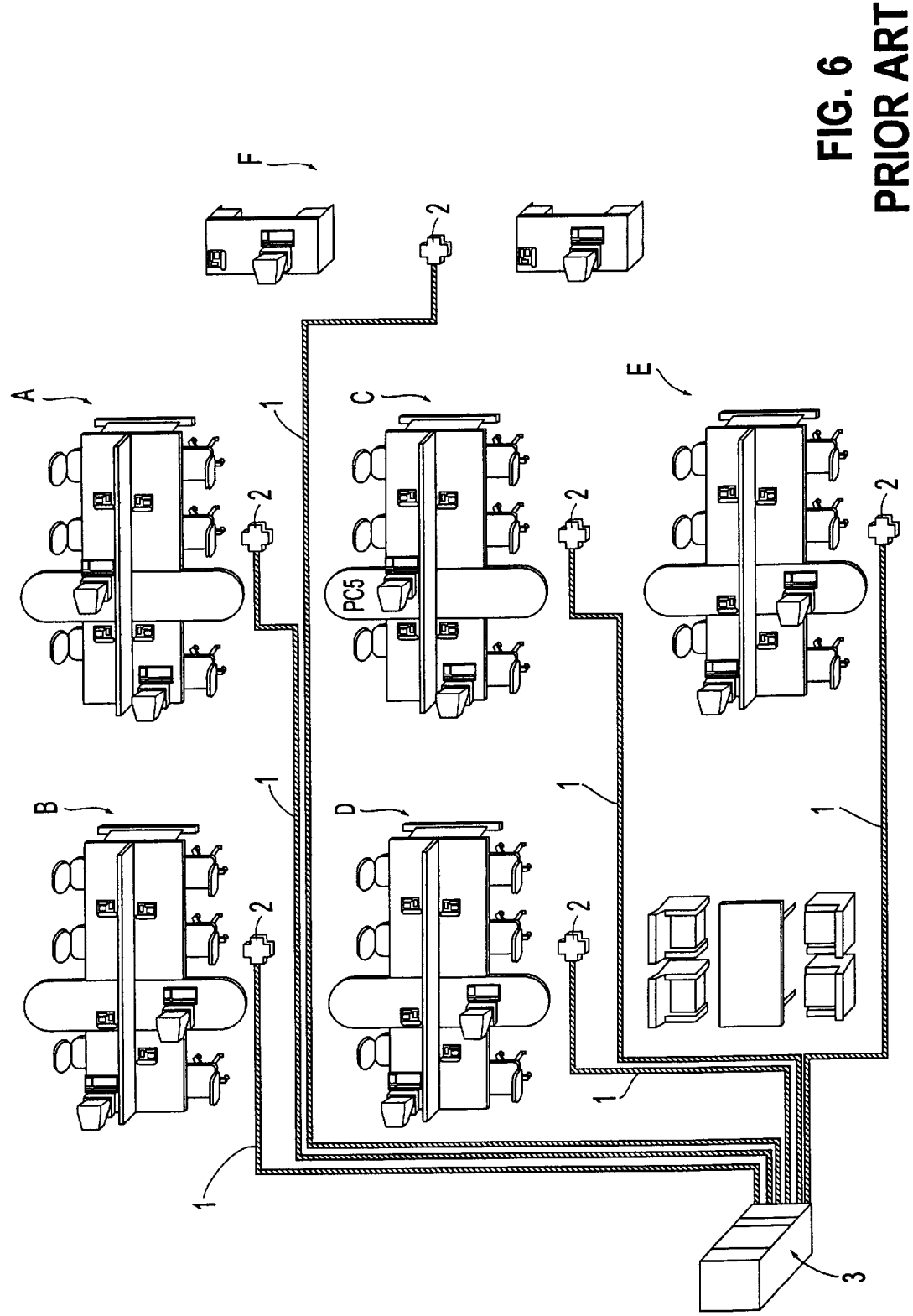
FIG. 6 is a diagram showing the wiring in a conventional office wiring system.
Figure 7:
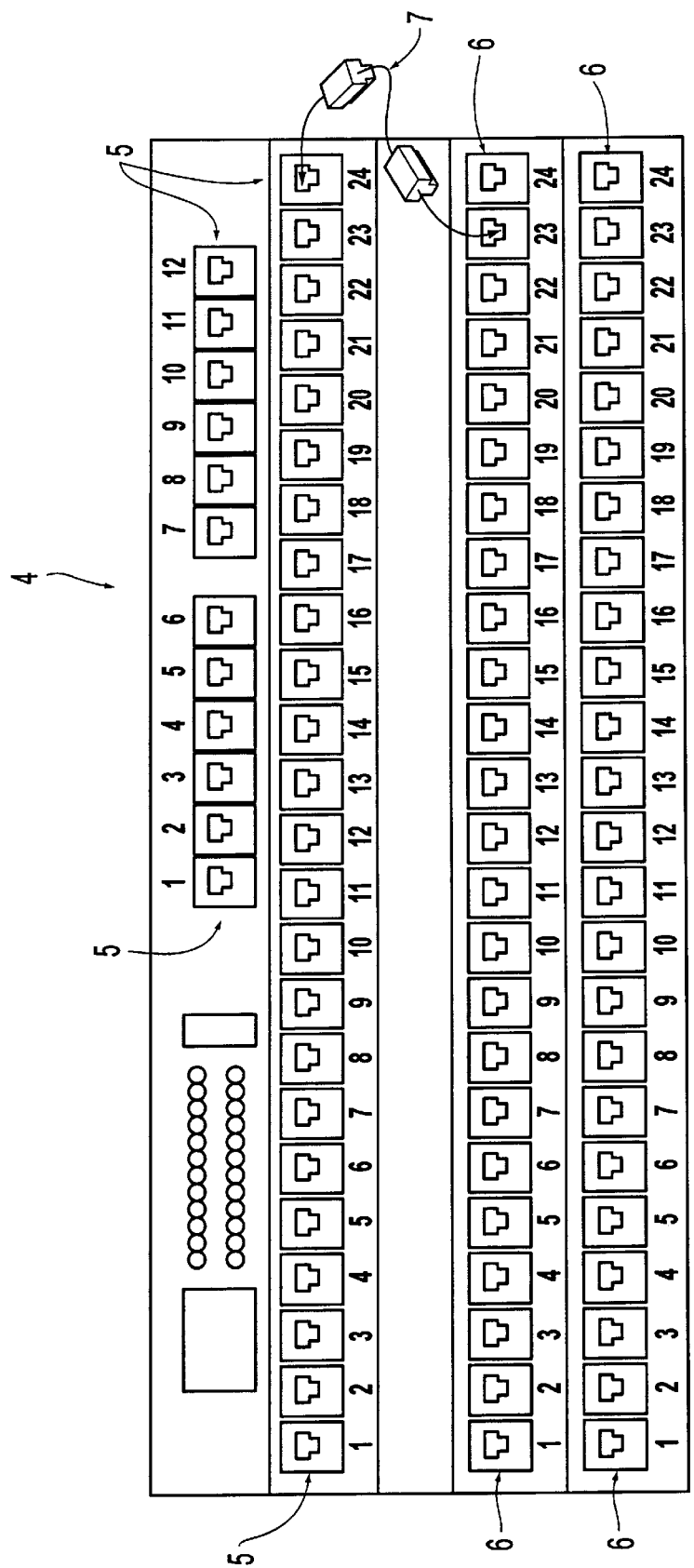
FIG. 7 is a view showing the plug board of an interconnection unit in the conventional wiring system of FIG. 6.

The plug board 30 shown in FIG. 4 is installed in the interconnection unit 10.

The plug board 30 is composed of a primary side 30a and a secondary side 30b as shown in FIG. 4. The modular outlets on the primary side 30a, connected to the external collective information devices, are arranged in a plurality of rows. The twelve modular outlets 31 connecting to a LAN unit are in a first transverse row and the twenty-four modular outlets 32 connected to a telephone switchboard are in a second row below. The identification digits "1" to "12" identifying the modular outlets 31 and the identification digits "1" to "24" identifying the modular outlets 32 are attached in accordance with the respective modular outlets 31 and 32 on a frame holding these modular outlets 31 and 32.

The modular outlets 21 installed on the respective circuit cables 20 of the wire harnesses 12 to 17 are arranged on the secondary side 30b as shown in FIGS. 2 and 4 in two transverse rows. The respective modular outlets 21 of each wire harness 12 to 17 are collectively arranged in blocks in these transverse rows. The identification digits "1" to "6", identifying the respective modular outlets 21 are attached on the frame holding the modular outlets 21, and the respective modular outlets 21 of the respective wire harnesses 12 to 17 are arranged in the switching part 30 so that the. abovementioned identification digits of the respective circuit cables 20 coincide with the identification digits on the frame.

Interconnection cables 33 (hereinafter referred to as the batch cables 33) are used to interconnect modular outlets 21 on the secondary side and the fixed modular outlets 31, 32 on the primary side. Only one batch cable 33 is illustrated but in practice as many as are needed are provided. The batch cables 33 have modular jacks on both ends of twisted pair wires. The modular jack at the primary side is connected to any one of the modular outlets 31, 32 and the modular jack on the other end is connected to any one of the modular outlets 21 at the secondary side. In this way the respective circuit cables 20 of the wire harnesses 12 to 17 are connected with the telephone switchboard or LAN unit in the desired manner.

The respective batch cables are distinguished by colors in accordance with the destination, that is to say, for example, the batch cables 33 connected with the modular outlets 31 of the LAN unit are colored in black and the batch cables 33 connected with the modular outlets 32 of the telephone switchboard are colored in white.

With this wiring of information circuits, in order to accommodate to a layout change, e.g. of personnel at the blocks A to F, it is possible to use the previous telephone numbers at a different seat after the layout change without renewing the laying of the wire harnesses 12 to 17, by rearranging the batch cables 33 in the plug board 30 of the interconnection unit 10, that is by carrying out a change of connection positions of the batch cables 33.

In the wire harnesses 12 to 17 of the respective blocks A to F, the respective modular outlets 21 are arranged in the connectors V1 to V6 so that the identification digits given to the respective circuit cables 20 coincide with the identification digits of the respective connectors V1 to V6, as described above. Further, the respective modular outlets 21 are installed on the plug board 30 so that the identification digits of the respective circuit cables 20 coincide with the identification digits on the frame. Therefore the respective modular outlets 21 installed on both ends of the respective circuit cables can be easily identified.

Therefore, for example, as shown in FIG. 5, if the layout table relating the information device terminals which are connected with the respective connectors V1 to V6, with the circuits to which the information device terminals are connected, that is, the identification digits of the modular outlets 21 to which the information device terminals are connected, is previously prepared, it is possible to smoothly carry out the work for rearranging the batch cables 33.

Next, the work necessary for replacing the batch cables 33 is described, by way of example, together with the effect, referring to a case in which the circuits of telephone sets are replaced between different blocks (for example, between the block C and the block D).

First, the modular outlets 21 of the circuit cables 20, to which the respective telephone sets are connected, are found at the secondary side of the switching part 30. As the modular outlets 21 are distinguished by colors for the respective blocks A to F as described above and are arranged in a row on the secondary side of the switching part 30, the position to which the modular outlets 21 of the block C and the block D are installed is searched first, according to their colors. Then the identification digits of the modular outlets 21 to which the telephone sets are connected according to the above-mentioned layout table are identified and the position of the modular outlets 21 on the switching part 30 is identified.

After the identification of the respective modular outlets 21, then the modular jacks of the batch cables 33 connected to the respective modular outlets 21 are removed and reconnected. The work is thus completed.

As the modular outlets 21 at the secondary side of the plug board 30 are distinguished by colors, it can be easily and rapidly recognized where the specific modular outlets 21 are installed in the switching part 30. Therefore, the modular outlets 21 can be efficiently searched in comparison with the case of conventional wiring by which the modular outlets are required to be searched, relying on only the sequential numbers given to the modular receptacles. Efficiency is therefore improved.

Further, as the batch cables 33 are distinguished by colors according to the external collective devices, at a glance a worker can identify which external devices the particular modular outlets 21 are connected to. Therefore, when the identification work after the layout change is carried out etc., for example, even if a very large number of batch cables 33 are complicatedly wired, the external collective devices connected can be easily identified. This also increases efficiency.

The modular outlets 21 at the secondary side of the plug board 30 are distinguished by colors for the blocks A to F, and the modular outlets 21 installed on both ends of the respective circuit cables of the wire harnesses 12 to 17 are identified by the same identification digits. Therefore, specific modular outlets 21 at the secondary side can be identified on the plug board 30 without the layout table shown in FIG. 5, by identifying the tape colors which bundle the respective wire harnesses 12 to 17 and the identification digits of the modular outlets 21 to which the information device terminals are connected in the connectors V1 to V6. Therefore, even if the layout table is lost or becomes inaccurate, the work of exchanging the batch cables 33 can be carried out, and in view of this, efficiency is improved in comparison with a conventional method for wiring by which the modular outlets cannot be identified on a plug board without a layout table.

In this embodiment, the respective wire harnesses 12 to 17 of the respective blocks A to F are identified by bundling the circuit cables 20 with a colored tape, but the wire harnesses 12 to 17 may be identified by coloring in the same color the respective circuit cables 20 themselves which constitute the respective wire harnesses 12 to 17.

The identifying digits are attached on the respective circuit cables 20, the frame of the switching part 30 and the housing of the connectors V1 to V6 as the identification symbols, but, for example, alphabet codes, Greek characters or any other suitable indicia or distinguishing marks may be used as the identification symbols.

Codes for clarifying the modular outlet groups of the blocks A to F which are bundled may be attached on the frame at the secondary side of the interconnection unit 10. In this case, for example, codes composed of the head letter of alphabet and the digits corresponding to the colors of the modular outlets of the blocks A to F may be used which is convenient when there are many blocks on the floor, etc. For example when there are many blocks, there may be a case in which the tape color 22 of two wire harnesses must be the same, and this may cause trouble in identifying the modular outlets on the interconnection unit 10 in such a case. Therefore, when there are two blocks whose tape color for the tapes 22 is "Red", the identification digits corresponding to the respective blocks are previously 15 determined, and codes "R1" and "R2" of which the identification digits are arranged after the head letter of alphabet indicating the tapes 22 can be attached on the frame of the interconnection unit 10. Thus, even if modular outlets having the same colors are used, it is convenient to be able to rapidly identify which blocks they correspond to. Further, when the colors of the tape 22 are "Green" and "Violet", the codes of "G1" and "G2" and the codes of "V1" and "V2" may be used.

As illustrated above, the method for wiring of the invention makes it easy to identify the installed position of the outlets on the secondary side because first identification symbols enabling identification of the blocks is attached to the circuit cord, the same identification symbol is attached to the socket on the secondary side, and the respective outlets on the secondary side corresponding to the same block are grouped together in the interconnection unit; in the method for wiring, wherein the circuit cables of the information device terminals are aggregated to the interconnection unit, the outlets on the secondary side are installed on the interconnection unit, and the information device terminals are connected to the external collective devices by mutually connecting the respective outlets on the primary side and the secondary side through the interconnecting cables. Therefore, the work for replacing or exchanging the interconnection cables can be efficiently carried out in comparison with a conventional wiring of this type.

Particularly, when the second identification symbols enabling identification of the circuit cables in the same block are attached to the respective circuit cables and the same identification symbols as the second identification symbols are attached to the outlets on the secondary side which correspond to the respective circuit cables, it can be easily identified which outlets at the secondary side the respective circuit cables correspond to.

Further, when identification symbols enabling identification of the specific external devices are attached to the respective interconnection cables, it can be easily identified which external collective devices the respective-circuit cables are connected to.

What is claimed is:

1. A wiring layout of information circuits which are used by personnel who work at a plurality of blocks, each block accommodating at least one person, the wiring layout comprising:

at each block, a plurality of outlet connectors connectable in use to information devices used by personnel at the block;

an interconnection unit having a plurality of primary connectors adapted to be connected to collective information handling devices, and a plurality of secondary connectors;

a plurality of wiring bundles, each comprising a plurality of wiring cables associated with a particular one of the blocks, the plurality of wiring cables connecting respective groups of the secondary connectors to respective ones of the blocks, the wiring cables of each wiring bundle terminating at the respective outlet connectors of the block; and a plurality of interconnection cables detachably and interchangeably connecting the primary connectors and the secondary connectors at the interconnection unit, wherein (i) first identification signs are provided on each bundle to identify respective ones of the blocks to which the wiring bundles are connected, the first identification signs being provided by a color-coded indicia tape wound around substantially an entire length of each bundle, (ii) at the interconnection unit, the plurality of the secondary connectors connected by a respective one of the wiring bundles to one of the blocks are grouped together in space, each group of secondary connectors being colored with the same color as the corresponding cable bundle indicia tape to identify the block and associated wiring bundle, and (iii) second identification signs are associated with the wiring cables to identify respective ones of the wiring cables in each said wiring bundle, and the same second identification signs are provided to identify respective secondary connectors to which the wiring cables are respectively connected.

2. A wiring layout according to claim 1, wherein third identification signs enabling identification of the collective information handling devices are provided on the interconnection cables.

3. A wiring layout according to claim 2, wherein the third identification signs are colors.

4. A wiring layout according to claim 1, wherein the second identification signs are numerical.

5. A readily reconfigurable information circuit wiring harness assembly adapted to extend between information device terminals of a specific work station among a plurality of work stations and an interconnection unit that connects the information device terminals to corresponding external collective information handling devices, said information circuit wiring harness assembly comprising:

at least two bundles of circuit cables, each having first and second ends;

a connector for each bundle having a plurality of sockets, the sockets being connected to the first end of a respective one of the at least two bundles and adapted to be connectable to individual information device terminals of a specific work station; and a plurality of plugs for each bundle, said plurality of plugs being connected to individual circuit cables at the second end of a respective one of said bundles, the plugs being adapted to be connectable to an interconnection unit, wherein a different, color-coded indicia tape is wound around substantially an entire length of each of said at least two bundles of circuit cables, and the respective plugs of each bundle are of a same color as the color-coded indicia tape, the combination of the colored bundle and colored plugs forming first identification signs allowing ready identification of a particular one of the at least two bundles of circuit cables, as well as the particular work station from which the plugs for the particular one bundle originate, further wherein second identification signs are provided on respective circuit cables of each bundle, and the same second identification signs are provided on corresponding socket accommodating portions formed on the connector, whereby the second identification signs allow ready identification of which plugs are connected to which information device terminals of the particular work station.

6. A readily reconfigurable information circuit wiring harness assembly according to claim 5, wherein at least one identification sign is provided on the connector to identify the work station.

7. A readily reconfigurable information circuit wiring harness assembly according to claim 5, wherein the wiring harness assembly further includes reconfigurable interconnection cables, each selectively connectable at a first end to a particular one of the plugs and at a second end to an information handling device, the interconnection cables being distinguished by colors according to a type of information device terminal that is being connected by the wiring harness assembly.

* * * * *